(12) United States Patent
Tsirkin

(10) Patent No.: US 10,740,131 B2
(45) Date of Patent: Aug. 11, 2020

(54) INPUT-OUTPUT BASED VIRTUAL CPU HALT

(71) Applicant: RED HAT, INC.

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 121 days.

(21) Appl. No.: 15/623,049

(22) Filed: Jun. 14, 2017

(65) Prior Publication Data

US 2018/0365042 A1    Dec. 20, 2018

(51) Int. Cl.
*G06F 9/455* (2018.01)

(52) U.S. Cl.
CPC ...... *G06F 9/45558* (2013.01); *G06F 9/45533* (2013.01); *G06F 2009/45575* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,875,162 B2 | 10/2014 | Agesen | |
| 8,881,150 B2 | 11/2014 | Sawa | |
| 9,164,789 B2 | 10/2015 | Tsirkin | |
| 9,367,345 B1 | 6/2016 | Tsirkin | |
| 2011/0113426 A1 | 5/2011 | Kung et al. | |
| 2011/0119422 A1* | 5/2011 | Grouzdev | G06F 9/4881 710/262 |
| 2015/0248237 A1* | 9/2015 | Tsirkin | G06F 3/061 711/162 |
| 2015/0339155 A1* | 11/2015 | Tsirkin | G06F 9/4837 710/267 |
| 2016/0077845 A1* | 3/2016 | Earl | G06F 9/5027 718/1 |
| 2016/0117190 A1* | 4/2016 | Sankaran | G06F 9/4812 710/267 |
| 2016/0147551 A1* | 5/2016 | Tsirkin | G06F 9/45558 718/1 |

OTHER PUBLICATIONS

Anonymous, "Best Practices for Performance Tuning of Latency-Sensitive Workloads in vSphere VMs," Retrieved from <http://www.vmware.com/content/dam/digitalmarketing/vmware/en/pdf/techpaper/vmw-tuning-latency-sensitive-workloads-white-paper.pdf>, published Mar. 28, 2013, 10 pages.

Matlack, "Message Passing Workloads in KVM," Retrieved from <http://events.linuxfoundation.org/sites/events/files/slides/Message%20Passing%20Workloads%20in%20KVM%20(SLIDES).pdf>, 31 pages.

Ahmad, "vIC: Interrupt Coalescing for Virtual Machine Storage Device IO," Retrieved from <http://www.mashtizadeh.com/papers/atc11-vic.pdf>, 14 pages.

* cited by examiner

Primary Examiner — Wynuel S Aquino
(74) Attorney, Agent, or Firm — Lowenstein Sandler LLP

(57) ABSTRACT

A hypervisor configures a plurality of halt registers, wherein each halt register of the plurality of halt registers is associated with a corresponding latency threshold value, and provides the plurality of halt registers to a guest operating system of a virtual machine. The hypervisor detects that the guest operating system of the virtual machine has accessed a halt register of the plurality of halt registers, determines a latency threshold value associated with the halt register accessed by the guest operating system, and performs a halt operation for a virtual processor of the virtual machine in view of the latency threshold value.

11 Claims, 5 Drawing Sheets

INPUT-OUTPUT BASED VIRTUAL CPU HALT

TECHNICAL FIELD

The present disclosure is generally related to computer systems, and more particularly, to input-output based virtual CPU halting in virtualized computer systems.

BACKGROUND

A virtual machine (VM) is an emulation of a computer system. When executed on appropriate hardware, a VM creates an environment allowing the virtualization of an actual physical computer system (e.g., a server, a mainframe computer, etc.). The actual physical computer system is typically referred to as a "host machine." Typically, a component on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS." In some implementations, the guest OS and applications executing within the guest OS can be collectively referred to as the "guest." A virtual machine may comprise one or more "virtual processors" (or "guest CPUs"), each of which maps, possibly in a many-to-one fashion, to a central processing unit (CPU) of the host machine.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
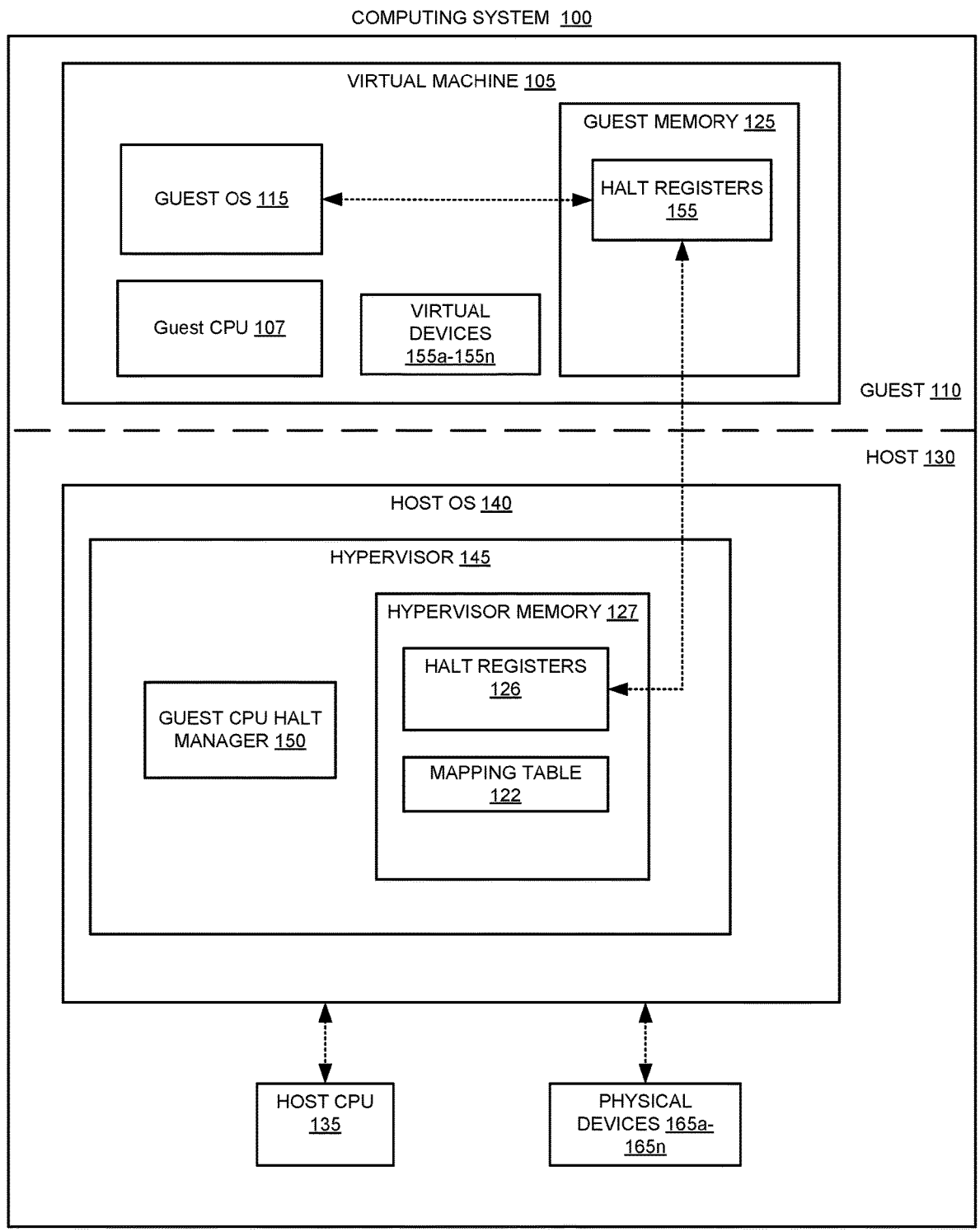
FIG. 1 depicts a high-level component diagram of an example computer system architecture, in accordance with one or more aspects of the present disclosure.

Described herein are methods and systems for input-output based virtual CPU halting. In virtualized systems, a typical way for guests to behave when a virtual processor (virtual CPU) becomes idle is to execute a "halt" instruction. This type of instruction notifies the hypervisor to halt the virtual CPU (e.g., place the virtual CPU in an idle state). The virtual CPU may subsequently be resumed on an interrupt received by the hypervisor that indicates that the virtual CPU has work to complete. This process (typically referred to as the "halt/resume cycle"), however, typically incurs significant latency overhead. Some conventional implementations attempt to mitigate this problem by using "halt polling." Halt polling is a process where a virtual CPU is halted, then the hypervisor polls for events directed to the virtual CPU. In other words, the hypervisor monitors system events to determine whether any events are directed to that virtual CPU. While polling, the hypervisor "pins" the associated host CPU for a period of time after detecting the halt instruction. Thus, the virtual CPU may be resumed quickly without giving up control of the physical CPU to other tasks.

The halt polling process can provide significant performance benefits to systems with predictable workflow. In many implementations, however, the hypervisor may make assumptions about the latency needs of the guests under its control. A guest's actual latency needs may vary drastically from hypervisor estimates. Thus, in many instances, a hypervisor may initiate polling while pinning a physical CPU when the guest can accommodate the execution of other long running tasks that can make use of the pinned physical CPU. Similarly, a hypervisor may initiate long running tasks that use the physical CPU when the guest may expect an event to be received for the virtual CPU in a relatively short amount of time, which can result in a latency increase due to the resulting context switching that may be needed to resume the halted virtual CPU. In both cases, since the hypervisor is not aware of the actual needs of the guest, it can often waste CPU cycles and prevent other virtual CPUs and other tasks from executing.

Aspects of the present disclosure address the above noted and other deficiencies by implementing input-output based virtual CPU halting. In particular, a hypervisor can configure a set of registers that may be used by a guest to communicate latency needs to the hypervisor. The hypervisor may associate each "halt register" with a particular latency threshold value and initiate a particular type of halt operation in accordance with the identified latency threshold. Once configured, the hypervisor may provide the guest OS with access to the set of registers so that the guest OS may indicate its latency needs at the time a virtual CPU becomes idle. Thus, the hypervisor may make a more efficient determination of whether to initiate polling, how long it should continue polling, whether polling may be interrupted, or whether a long running task should instead be executed instead of polling. Accordingly, the hypervisor may achieve significant reductions in CPU utilization for management of idle virtual CPUs. Additionally, in some implementations, the halt registers may be input-output (I/O) registers associated with a power management interface (e.g., an Advanced Configuration and Power Interface (ACPI)). Thus, aspects of the present disclosure provide the ability for existing guests to communicate latency information to the hypervisor by performing input/output read operations using the existing ACPI framework. Accordingly, the benefits noted above may be achieved without involving modifications to existing guests.

In an illustrative example, a hypervisor configures a plurality of halt registers, wherein each halt register of the plurality of halt registers is associated with a corresponding latency threshold value, and provides the plurality of halt registers to a guest operating system of a virtual machine. The hypervisor detects that the guest operating system of the virtual machine has accessed a halt register of the plurality of halt registers, determines a latency threshold value associated with the halt register accessed by the guest operating system, and performs a halt operation for a virtual processor of the virtual machine in view of the latency threshold value.

FIG. 1 depicts a high-level component diagram of an illustrative example of a computer system 100, in accordance with one or more aspects of the present disclosure. Other architectures for computer system 100 are possible, and implementations of a computer system utilizing examples of the present disclosure are not limited to the specific architecture depicted by FIG. 1.

As shown in FIG. 1, the computing system 100 hosts a virtual machine (VM) 105. The virtual machine 105 runs a guest (e.g., guest 110) that uses a guest operating system 115 to manage its resources. The virtual machine 105 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor that is installed on a disk, loaded into memory, or currently running. A guest may include one or more of the following: a firmware copy in memory, an operating system, additional installed applications, a browser, applications running on the browser, etc. The term "virtual machine" (VM) refers to part of a host system that is visible to the guest. A virtual machine may include one or more of the following: memory (e.g., guest memory 125), virtual CPU (e.g., a guest CPU 107), virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest 110, etc.

In one example, the computing system 100 runs a hypervisor 145 to virtualize or expose access to underlying host hardware of a host 130, making the use of the virtual machine 105 transparent to the guest 110 and the users of the computing system 100. In one example, the hypervisor 145 may support the virtual machine 105. In one example, the hypervisor 145 is part of a host operating system (OS) 140 of the host 130.

In some implementations, the computing system 100 may also include hardware components (host hardware) including a host central processing unit (CPU) 135. The computing system 100 may also include host memory (not shown) and physical devices 165a-165n. In a virtualized environment, a virtual machine 105 may not have direct access to the physical devices 165a-165n.

Access to or emulation of a physical device (e.g., 165a) may be indirectly handled by the intervening hypervisor 145. The guest 110 may be configured to load device-specific modules (guest device drivers) associated with one or more virtual devices 155a-155n. In some implementations, virtual devices 155a-155n may correspond to one or more virtual Peripheral Component Interconnect (PCI) devices. The hypervisor 145 may be configured to emulate (e.g., provide the guest 115 with access to) the one or more virtual devices 155a-155n in cooperation with the guest device drivers residing on the virtual machine 105.

Guest CPU halt manager 150 may be responsible for configuring halt registers 126 to facilitate input-output based halting of virtual processors (e.g., guest CPUs 107) for guest 110. In some implementations, guest CPU halt manager 150 may be a component of a scheduler application executing on hypervisor 145. Alternatively, guest CPU halt manager 150 may be a separate component of hypervisor 145. Halt registers 126 may be an area of hypervisor memory 127 to be provided to guest 100 for access (e.g., exposed to guest 110 as halt registers 155). In some implementations, halt registers 126 may be general purpose registers within hypervisor memory 127. Additionally or alternatively, halt registers 126 may be input-output (I/O) registers associated with an ACPI interface. Thus, as noted above, existing guests may communicate latency information to the hypervisor by performing input/output read operations using an existing ACPI framework.

In some implementations, guest CPU halt manager 150 may configure the halt registers 126 such that each register is associated with a particular latency threshold value. Each latency threshold value may represent a period of time for waking a virtual processor from an idle state. For example, one latency threshold value may represent an amount of time to successfully process an interrupt to wake an idle virtual processor. Similarly, another threshold value may represent an amount of time to complete a context switch operation between virtual processors. A context switch operation can occur when a first virtual processor becomes idle, a second virtual processor is scheduled to execute (e.g., to process another task unrelated to the first virtual processor), but subsequently the hypervisor determines that the first virtual processor should resume execution.

Guest CPU halt manager 150 may determine latency threshold values by accessing a configuration file, by analyzing execution statistics stored in a historical data store, by receiving information from an administrator console, or in any similar manner. In one embodiment, guest CPU halt manager 150 may determine the latency threshold values according to particular operations as described above (e.g., processing an interrupt, completing a context switch, etc.). Alternatively, guest CPU halt manager 150 may set the latency threshold values in increments (e.g., 10 microseconds, 20 microseconds, 30 microseconds, etc.).

Guest CPU halt manager 150 may map each threshold value to a separate halt register 126. In some implementations, guest CPU halt manager 150 may map a threshold value to the address of a halt register and store the mapping in mapping table 122. As shown in FIG. 1, mapping table 122 may be stored in hypervisor memory 127. Alternatively, mapping table 122 may be stored in shared memory (e.g., memory space shared with guest 110), on a storage device, or in any similar manner.

Once guest CPU halt manager 150 has provided halt registers 126 (mapped to guest memory 125 as halt registers 155), guest OS 115 may then access one of the halt registers to indicate to hypervisor 145 that guest CPU 107 is to be halted (e.g., when guest CPU 107 becomes idle). In some implementations, guest OS 115 may access a halt register by performing an input-output (I/O) read of the halt register (e.g., a read of the address associated with the halt register). Notably, guest OS 115 may perform an I/O read of a register associated with an existing ACPI interface for power management operations. For example, if guest OS 115 determines that guest CPU 107 has become idle, guest OS 115 may read one of halt registers 155. Guest CPU 107 may become idle when it is waiting for an event to trigger that indicates it has an operation to perform. For example, if guest CPU 107 writes a networking packet to a networking device, it may enter an idle state until a response to the networking packet is ready for processing.

Notably, guest OS 115 may communicate latency needs to hypervisor 145 by accessing the appropriate halt register. Thus, if the guest OS 115 desires the lowest possible latency it can issue a halt instruction without accessing one of the halt registers 155. If, however, guest OS 115 expects a higher latency for guest CPU 107 it can select one of the halt registers 155 that adds the smallest amount of additional latency relative to that expected for guest CPU 107. In other words, guest OS 115 may select the halt register that is associated with a latency threshold value that represents a small portion of the expected wait time for resuming execution of guest CPU 107. For example, if guest OS 115 determines that guest CPU 107 is to become idle (e.g., waiting for an event to indicate that it should resume execution) and the expected wait time is 100 microseconds, guest OS 115 may access the halt register associated with a latency value that is the smallest percentage of that wait time (e.g., a halt register associated with a latency threshold of 10 microseconds). Thus, guest OS 115 can communicate its latency needs to hypervisor 145 so that guest CPU halt manager 150 may make intelligent decisions with respect to efficient management of scheduling guest CPU 107.

Guest CPU halt manager 150 may subsequently detect that guest OS 115 has accessed one of halt registers 155. In some implementations, guest CPU halt manager 150 may detect the access by detecting an exit cause by the guest OS 115 reading the register. Guest CPU halt manager 150 may then use the address associated with the accessed halt register and identify the associated latency threshold value by accessing the information stored in mapping table 122. Guest CPU halt manager 150 may then use the associated latency threshold value to determine the type of halt operation to perform for the guest CPU 107. For example, guest CPU halt manager 150 may halt guest CPU 107 and begin polling for events to trigger guest CPU 107 to resume execution. In some implementations, guest CPU halt manager 150 may execute polling with interrupts enabled (e.g., to allow high priority tasks to execute while polling), execute polling without interrupts enabled (e.g., to prevent high priority tasks from executing while polling), execute polling for a particular period of time, execute an unrelated task without polling the guest CPU 107, or the like. Guest CPU halt manager 150 is described in further detail below with respect to FIG. 2.

Figure 2:
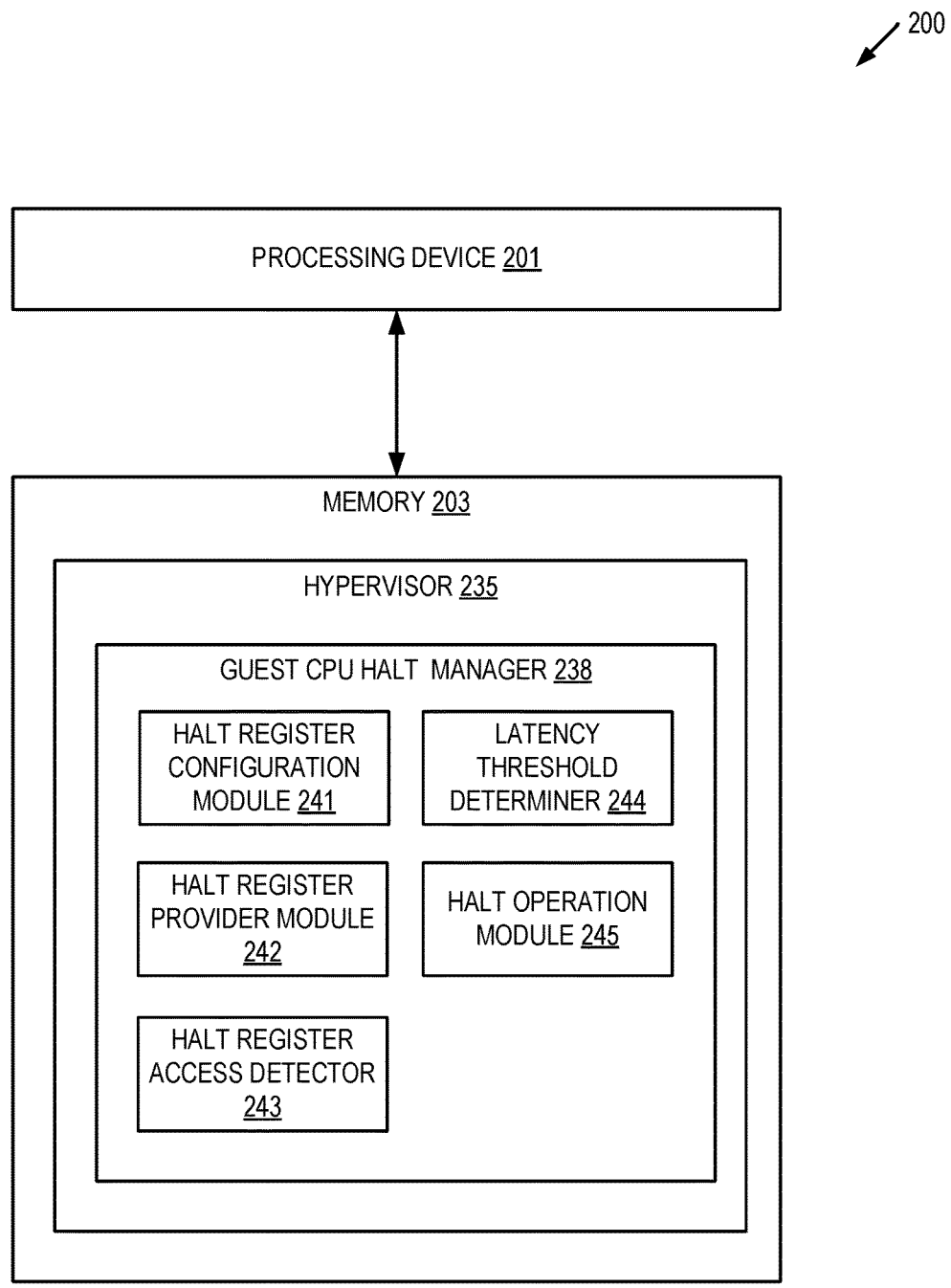
FIG. 2 depicts a block diagram illustrating an example of a guest CPU halt manager for facilitating input-output based virtual CPU halting, in accordance with one or more aspects of the present disclosure.

FIG. 2 depicts a block diagram illustrating an example guest CPU halt manager 238 for facilitating input-output based guest CPU halting. In some implementations, guest CPU halt manager 238 may correspond to guest CPU halt manager 150 of FIG. 1. As shown in FIG. 2, guest CPU halt manager 238 may be a component of a computing apparatus 200 that includes a processing device 201, operatively coupled to a memory 203, to execute a hypervisor 235. In some implementations hypervisor 235 may correspond to hypervisor 145 of FIG. 1. In some implementations, processing device 201 and memory 203 may correspond to processing device 502 and main memory 504 respectively as described below with respect to FIG. 5.

Guest CPU halt manager 238 may include halt register configuration module 241, halt register provider module 242, halt register access detector 243, latency threshold determiner 244, and halt operation module 245. Alternatively, the functionality of one or more of halt register configuration module 241, halt register provider module 242, halt register access detector 243, latency threshold determiner 244, and halt operation module 245 may be combined into a single module or divided into multiple sub-modules.

Halt register configuration module 241 is responsible for configuring a set of halt registers (e.g., halt registers 126 in FIG. 1) to be provided to a guest OS of a virtual machine (e.g., guest OS 115 of VM 105 in FIG. 1) for management of input-output based virtual processor (e.g., guest CPU 107 in FIG. 1) halt management. As noted above, halt registers may be an area of hypervisor memory to be provided to a guest OS for access. In some implementations, halt registers may be general purpose registers within hypervisor memory. Alternatively, halt registers may be power management registers associated with an ACPI interface.

Halt register configuration module 241 may configure multiple halt registers where each halt register is associated with a latency threshold value. As noted above with respect to FIG. 1, each latency threshold value may represent a period of time for waking a virtual processor from an idle state. In some implementations, halt register configuration module 241 may determine a latency threshold value that represents an amount of time to successfully process an interrupt to wake an idle virtual processor. Similarly, halt register configuration module 241 may determine another threshold value that represents an amount of time to complete a context switch operation between virtual processors.

In various implementations, halt register configuration module 241 may determine latency threshold values by accessing a configuration file of stored threshold values, by analyzing virtual processor execution statistics stored in a historical data store, by receiving information from an administrator console, or in any similar manner. In an illustrative example, during hypervisor initialization (e.g., hypervisor startup), halt register configuration module 241 may automatically determine the latency threshold value that represents the time to complete a context switch by starting a virtual processor and forcing it to exit while measuring how long the virtual processor takes to complete the exit operation and transfer control to another virtual processor. In another illustrative example, halt register configuration module 241 may collect statistics for each type of interrupt supported by the system and determine an average time needed to complete a particular type of task. Halt register configuration module 241 may then use this information to set a latency threshold value according to the statistical analysis.

In some implementations, these determinations may be completed during initialization of hypervisor 235. Alternatively, halt register configuration module 241 may periodically update the latency threshold values using a background monitor task that analyzes recently captured statistics. Once the latency threshold values have been determined, they may then be associated with particular halt registers by mapping the threshold values to particular register addresses. These mappings may be subsequently stored in a mapping table to be used by latency threshold determiner 244 as described below.

Subsequently, halt register provider module 242 may be invoked to provide the configured halt registers to the guest OS of the VM. In some implementations, halt register provider module 242 may map the halt register addresses to corresponding virtual memory locations within memory accessible by the guest OS. Alternatively, halt register provider module 242 may provide the halt registers to the guest OS by exposing them to the guest OS via power management interface such as an ACPI interface.

As noted above with respect to FIG. 1, a guest OS may access one of the halt registers (e.g., by executing a read of the appropriate address of the halt register) to communicate latency needs to hypervisor 235. In some implementations, a guest OS may access a halt register by performing an input-output (I/O) read of the halt register (e.g., a read of the address associated with the halt register). In some implementations, a guest OS access of a halt register may cause an exit to hypervisor 235. Halt register access detector 243 may detect this exit (or other similar notification generated when a guest accesses a halt register). In detecting the exit, halt register access detector 243 may receive information from the guest OS that indicates which halt register has been accessed. For example, halt register access detector 243 may receive the address associated with the halt register that has been read by the guest OS.

Subsequently, latency threshold determiner 244 may be invoked to determine the latency threshold value associated with the halt register that was accessed by the guest OS. In some implementations, latency threshold determiner 244 may make this determination by accessing the mapping table described above using the address of the accessed halt register. Latency threshold determiner 244 may then select the entry from the mapping table that matches the address of the accessed halt register and set the latency threshold using the entry from the mapping table.

Halt operation module 245 may then be invoked to perform a halt operation of a virtual processor of the virtual machine using the determined latency threshold value. In some implementations, halt operation module 245 may halt the virtual processor and begin polling for an event that causes hypervisor 235 to resume execution of that virtual processor. For example, if the guest OS accesses a halt register where the associated latency value represents the amount of time to complete an interrupt, halt operation module 245 may poll for an event associated with the virtual processer where polling is performed with interrupts enabled. Thus, while the guest OS expects an event to be generated in a relatively short period of time, halt operation module 245 may conduct polling for events while allowing a high priority tasks to execute. If halt operation module 245 encounters a high priority task (e.g., by detecting an interrupt associated with the high priority task), it may pause polling, execute that high priority task, and resume polling.

In some implementations, halt operation module 245 may perform polling for a particular period of time, and upon expiration of that period of time, terminate polling for events for the virtual processor. For example, the mapping table may store, along with the latency threshold value, a time period for performing polling. If a guest OS reads the address of the associated halt register, halt operation module 245 may perform polling for the period of time stored in the mapping table. In such cases, halt operation module 245 may then resume execution of the virtual processor responsive to detecting an interrupt for the virtual processor (or other similar notification).

In some implementations, halt operation module 245 may halt the virtual processor and execute another task that is not associated with the halted virtual processor without performing polling. For example, if the guest OS accesses a halt register where the associated latency value represents the amount of time to complete a context switch from another virtual processor, halt operation module 245 may execute at least one other task not associated with the halted virtual processor. In such cases, the guest OS may have determined that the halted virtual processor may not expect an event for an extended period, and thus it can accommodate a larger latency time. Thus, it may access the appropriate halt register to notify halt operation module 245 that it may execute a longer running task. For example, halt operation module 245 may schedule another virtual processor to execute.

In some implementations, as noted above, halt registers may be configured with latency threshold values associated with particular operations (e.g., the time for complete processing of an interrupt, the time to complete a context switch, etc.). Alternatively, the halt registers may be configured in time increments (e.g., 10 microseconds, 20 microseconds, 30 microseconds, or the like) to provide the guest OS with greater flexibility in communicating scheduling needs to guest CPU halt manager 238. Similarly, guest CPU halt manager 238 may configure associated halt registers such that halt operations are conducted differently than in the examples described above. Various implementations may configure the halt registers to trigger the performance of polling with interrupts enabled, polling with interrupts disabled, no polling, or other similar methods of managing halt operations for a virtual processor.

Figure 3:
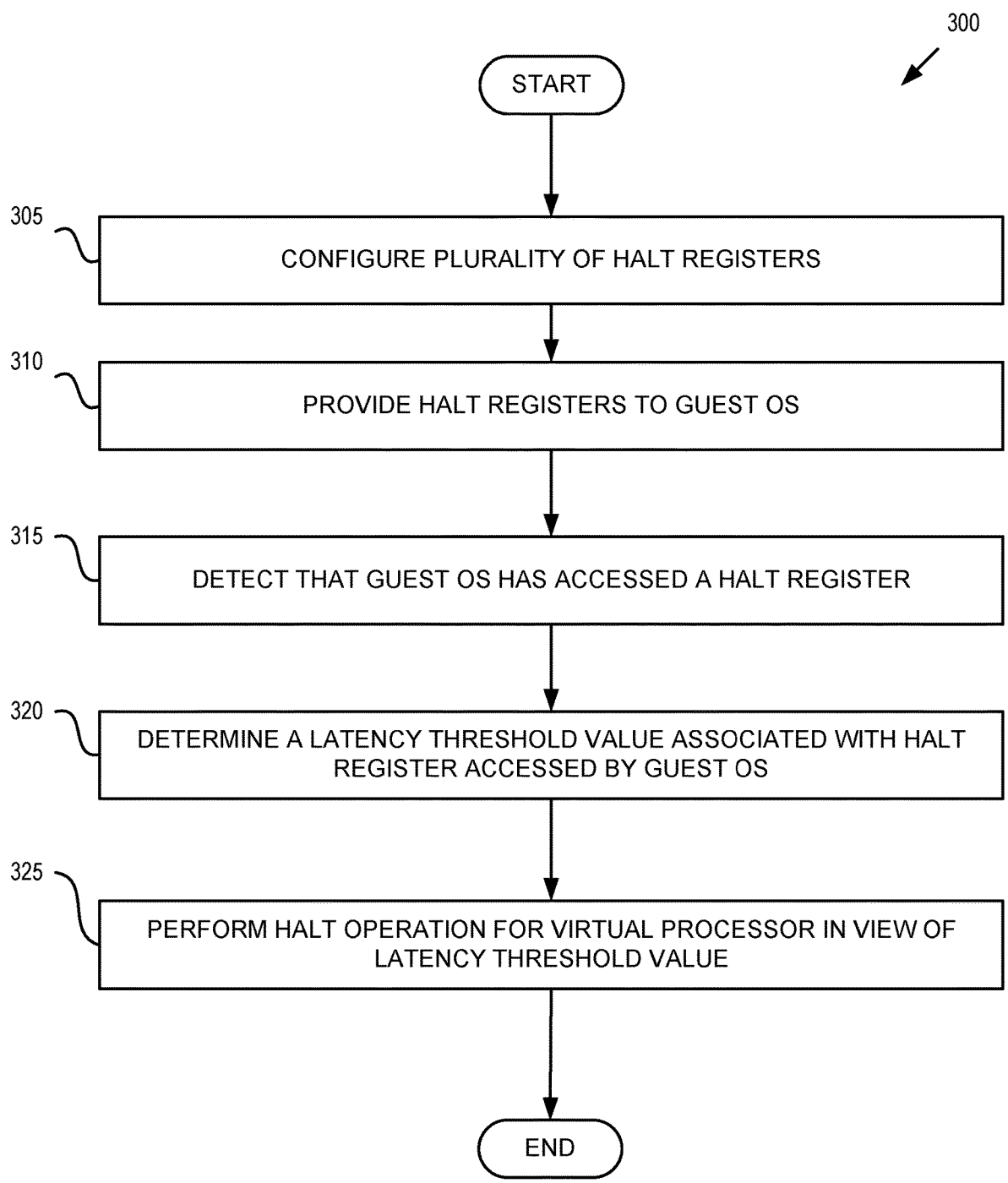
FIG. 3 depicts a flow diagram of a method for facilitating input-output based virtual CPU halting, in accordance with one or more aspects of the present disclosure.

FIG. 3 depicts a flow diagram of an example method 300 for facilitating input-output based guest CPU halting. The method may be performed by processing logic that may comprise hardware (circuitry, dedicated logic, etc.), computer readable instructions (run on a general purpose computer system or a dedicated machine), or a combination of both. In one illustrative example, method 300 may be performed by guest CPU halt manager 150 of hypervisor 145 in FIG. 1 and/or guest CPU halt manager 238 in FIG. 2. Alternatively, some or all of method 300 might be performed by another module or machine. It should be noted that blocks depicted in FIG. 3 could be performed simultaneously or in a different order than that depicted.

At block 305, processing logic configures a plurality of halt registers. In some implementations, each halt register is associated with a corresponding latency threshold value. In some implementations, halt registers may be general purpose registers within hypervisor memory. Alternatively, halt registers may be power management registers associated with an ACPI interface. At block 310, processing logic provides the halt registers to a guest OS of a virtual machine. In some implementations, processing logic may provide the halt registers to the guest OS by mapping the halt register addresses to corresponding virtual memory locations within memory accessible by the guest OS. Alternatively, processing logic may provide the halt registers to the guest OS by exposing them to the guest OS via power management interface such as an ACPI interface.

At block 315, processing logic detects that the guest OS has accessed one of the halt registers. In some implementations, processing logic may detect an exit generated when the guest OS performs a read of an address associated with one of the halt registers. At block 320, processing logic determines a latency threshold value associated with the halt register accessed by the guest OS. In some implementations, processing logic accesses a mapping table using the address of the accessed halt register and selects the entry from the table with that matches that address.

At block 325, processing logic performs a halt operation for a virtual processor in view of the latency threshold value determined at block 320. In some implementations, processing logic may halt the virtual processor then begin polling. Processing logic may execute polling with interrupts enabled (e.g., to allow high priority tasks to execute while polling), execute polling without interrupts enabled (e.g., to prevent high priority tasks from executing while polling), execute polling for a particular period of time, execute an unrelated task without polling the virtual processor, or the like. In an illustrative example, processing logic may perform the halt operation as described below with respect to FIG. 4. After block 325, the method of FIG. 3 terminates.

Figure 4:
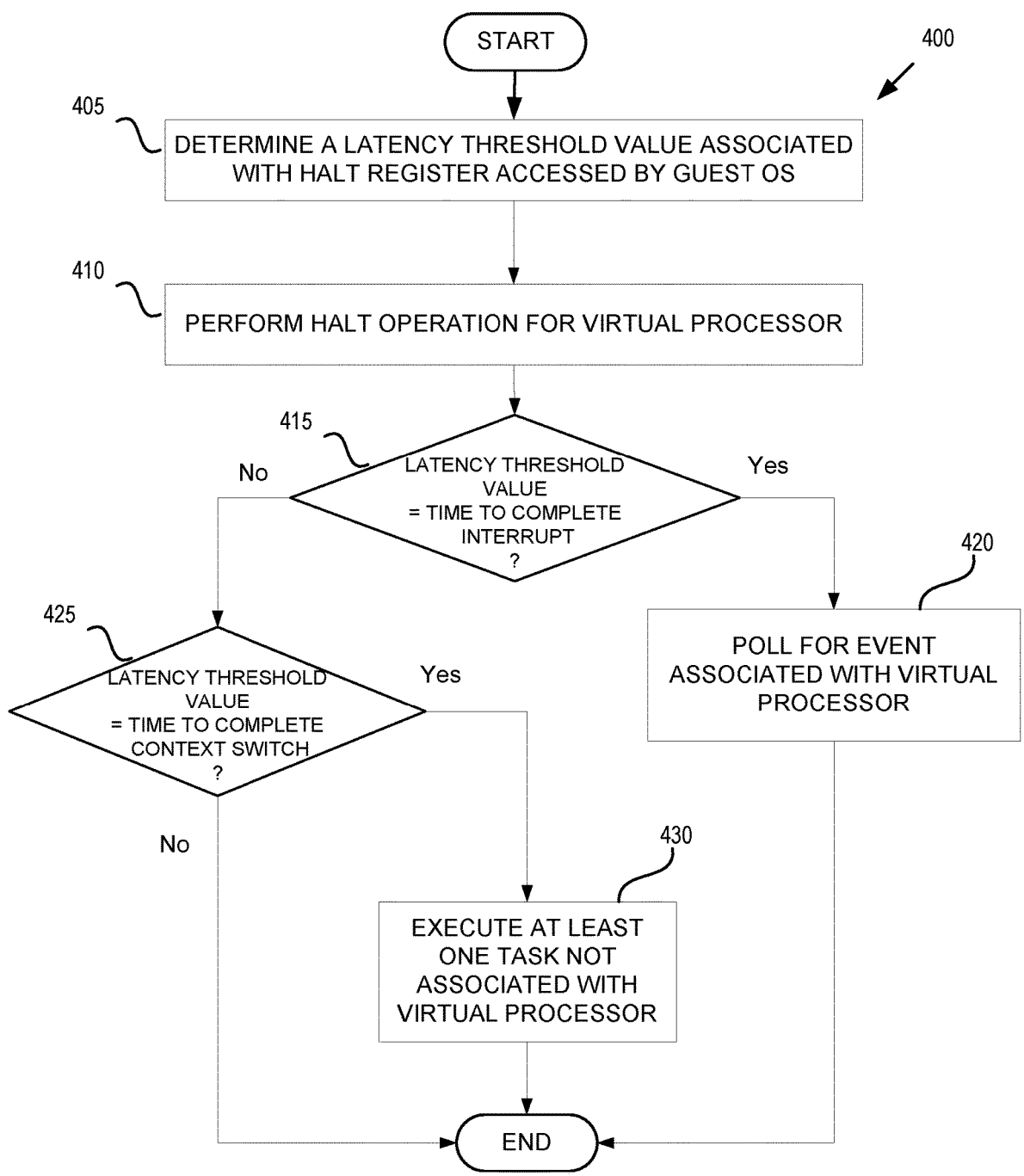
FIG. 4 depicts a flow diagram of a method for performing a halt operation for a virtual processor using latency values of halt registers, in accordance with one or more aspects of the present disclosure.

FIG. 4 depicts a flow diagram of an example method 400 for performing a halt operation for a virtual processor using latency values of halt registers. The method may be performed by processing logic that may comprise hardware (circuitry, dedicated logic, etc.), computer readable instructions (run on a general purpose computer system or a dedicated machine), or a combination of both. In one illustrative example, method 400 may be performed by guest CPU halt manager 150 of hypervisor 145 in FIG. 1 and/or guest CPU halt manager 238 in FIG. 2. Alternatively, some or all of method 400 might be performed by another module or machine. It should be noted that blocks depicted in FIG. 4 could be performed simultaneously or in a different order than that depicted.

At block 405, processing logic determines a latency threshold value associated with the halt register accessed by a guest OS of a virtual machine. In some implementations, this determination is made as described above in block 320 of FIG. 3. At block 410, processing logic performs a halt operation for a virtual processor of the virtual machine. At block 415, processing logic branches based on the latency threshold determined at block 405. If processing logic determines that the latency threshold value represents an amount of time to complete an interrupt, processing continues to block 420. At block 420, processing logic polls for an event associated with the virtual processor. In some implementations, the polling is performed with interrupts enabled (e.g., to permit execution of high priority tasks). Alternatively the polling is performed with interrupts disabled (e.g., to prevent execution of any other tasks while polling is being performed. After block 420, the method of FIG. 4 terminates.

If at block 410, processing logic determines that the latency threshold value does not represent the time to complete an interrupt, processing proceeds to block 425. At block 425, processing logic branches based on whether the latency threshold value represents the time to complete a context switch for the virtual processor. If not, the method of FIG. 4 terminates. Otherwise, processing proceeds to block 430. At block 430, processing logic executes at least one task that is not associated with the halted virtual processor. In some implementations, processing logic may execute an unrelated long running task such as a different virtual processor. After block 430, the method of FIG. 4 terminates. While method of FIG. 4 describes two latency threshold values and their associated halt operations, in other implementations, the method of FIG. 4 may include additional latency threshold values and the corresponding halt operations for each additional value.

Figure 5:
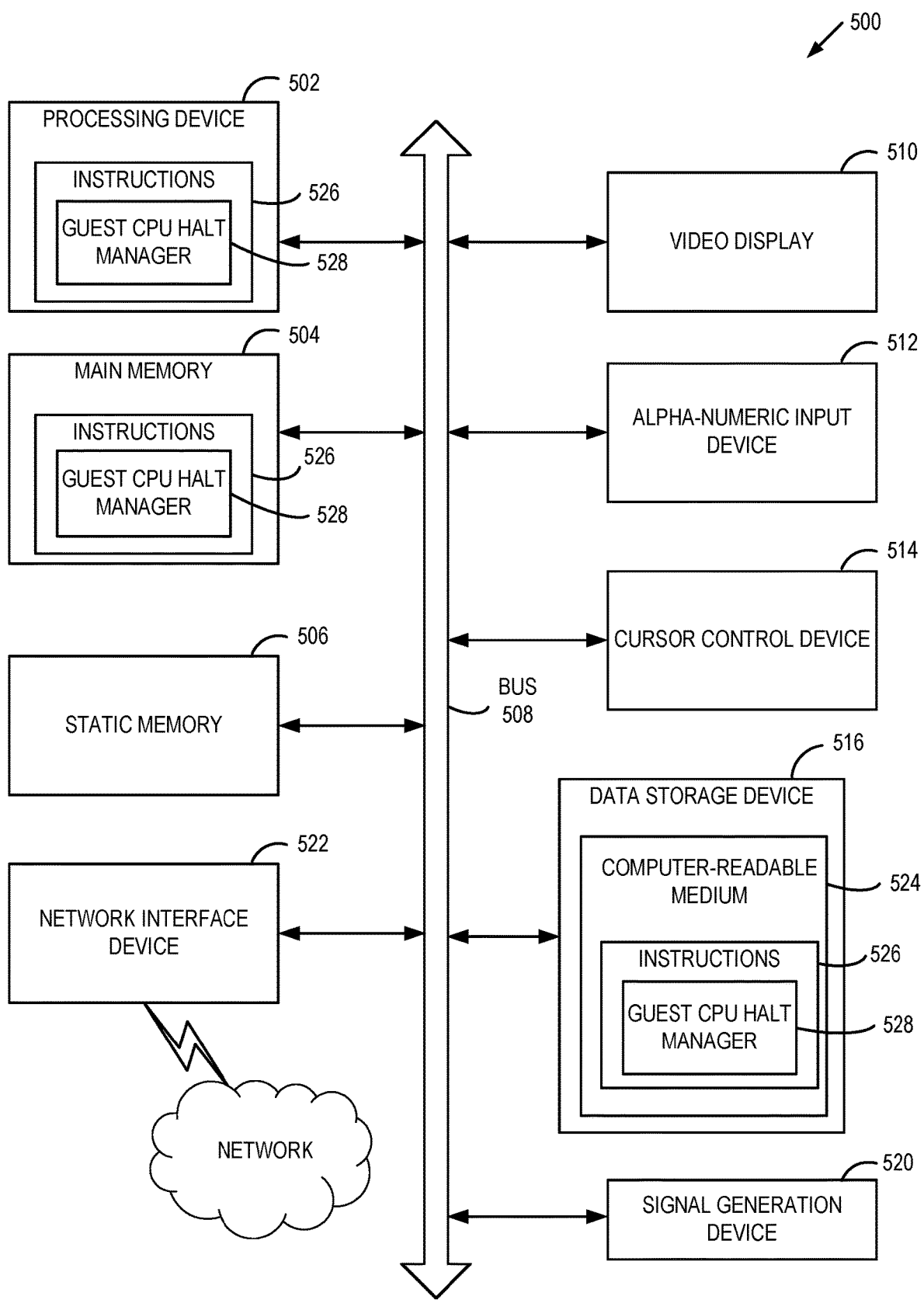
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes guest CPU halt manager 528 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include guest CPU halt manager 528 (e.g., corresponding to the methods of FIGS. 3-4, etc.) embodying any one or more of the methodologies or functions described herein. Guest CPU halt manager 528 may also reside, completely or at least partially, within the main memory 504 and/or within the processing device 502 during execution thereof by the computer system 500, the main memory 504 and the processing device 502 also constituting computer-readable media. Guest CPU halt manager 528 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "configuring," "detecting," "providing," "determining," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method, comprising:
configuring, by a processing device executing a hypervisor, a plurality of halt registers, wherein each halt register of the plurality of halt registers is associated with a corresponding latency threshold value, wherein configuring the plurality of halt registers comprises:
determining, for each halt register of the plurality of halt registers, a corresponding latency threshold value comprising an amount of time to complete a context switch operation between virtual processors; and
storing, in a mapping table, a mapping of the corresponding latency threshold value to an address for the respective halt register;
providing the plurality of halt registers to a guest operating system of a virtual machine;
detecting that the guest operating system of the virtual machine has accessed a halt register of the plurality of halt registers;
determining, by the processing device executing the hypervisor, a latency threshold value associated with the halt register accessed by the guest operating system; and
performing, by the processing device executing the hypervisor, a halt operation for a virtual processor of the virtual machine in view of the latency threshold value, wherein performing the halt operation comprises:
determining that the latency threshold value comprises an amount of time to complete a context switch operation between virtual processors; and
executing at least one task that is not associated with the virtual processor.

2. The method of claim 1, wherein the plurality of halt registers comprises a plurality of input-output (I/O) registers and wherein detecting that the guest operating system of the virtual machine has accessed a halt register comprises detecting that the guest operating system of the virtual machine has performed an I/O read of an I/O register of the plurality of I/O registers.

3. The method of claim 1, wherein detecting that the guest operating system has accessed the halt register comprises:
detecting an exit caused by the guest operating system executing a read of an address of the halt register.

4. The method of claim 1, wherein determining the latency threshold value associated with the halt register comprises:

accessing a mapping table using an address of the halt register; and selecting an entry from the mapping table that matches the address of the halt register.

5. A computing apparatus comprising:

a memory; and a processing device, operatively coupled to the memory, to execute a hypervisor to:

configure a plurality of halt registers, wherein each halt register of the plurality of halt registers is associated with a corresponding latency threshold value, wherein to configure the plurality of halt registers, the hypervisor is further to store, in a mapping table, a mapping of the corresponding latency threshold value to an address for the respective halt register;

provide the plurality of halt registers to a guest operating system of a virtual machine;

detect that the guest operating system of the virtual machine has accessed a halt register of a plurality of halt registers;

determine a latency threshold value associated with the halt register accessed by the guest operating system; and perform a halt operation for a virtual processor of the virtual machine in view of the latency threshold value, wherein to perform the halt operation, the hypervisor is further to: determine that the latency threshold value comprises an amount of time to complete a context switch operation between virtual processors; and execute at least one task that is not associated with the virtual processor.

6. The computing apparatus of claim 5, wherein the plurality of halt registers comprises a plurality of input-output (I/O) registers, and wherein to detect that the guest operating system of the virtual machine has accessed a halt register, the processing device is to detect that the guest operating system of the virtual machine has performed an I/O read of an I/O register of the plurality of I/O registers.

7. The computing apparatus of claim 5, wherein to configure the plurality of halt registers, the hypervisor is to:

determine a first latency threshold value comprising a first amount of time to complete a context switch operation between virtual processors; and store, in the mapping table, a first mapping of the second latency threshold value to a first address for a first halt register of the plurality of halt registers.

8. The computing apparatus of claim 5, to detect that the guest operating system has accessed the halt register, the hypervisor is to:

detect an exit caused by the guest operating system executing a read of an address of the halt register.

9. The computing apparatus of claim 5, wherein to determine the latency threshold value associated with the halt register, the hypervisor is to:

access a mapping table using an address of the halt register; and select an entry from the mapping table that matches the address of the halt register.

10. A non-transitory computer readable storage medium, having instructions stored therein, which when executed by a processing device of a computer system, cause the processing device to:

configure, by the processing device executing a hypervisor, a plurality of halt registers, wherein each halt register of the plurality of halt registers is associated with a corresponding latency threshold value, wherein to configure the plurality of halt registers comprises, the processing device is further to:

determine, for each halt register of the plurality of halt registers, a corresponding latency threshold value comprising an amount of time to complete a context switch operation between virtual processors; and store, in a mapping table, a mapping of the corresponding latency threshold value to an address for the respective halt register;

provide the plurality of halt registers to a guest operating system of a virtual machine;

detect that the guest operating system of the virtual machine has accessed a halt register of the plurality of halt registers;

determine, by the processing device executing the hypervisor, a latency threshold value associated with the halt register accessed by the guest operating system; and perform, by the processing device executing the hypervisor, a halt operation for a virtual processor of the virtual machine in view of the latency threshold value, wherein to perform the halt operation, the processing device is further to:

determine that the latency threshold value comprises an amount of time to complete a context switch operation between virtual processors; and execute at least one task that is not associated with the virtual processor.

11. The non-transitory computer readable storage medium of claim 10, wherein the plurality of halt registers comprises a plurality of input-output (I/O) registers, and wherein to detect that the guest operating system of the virtual machine has accessed a halt register, the processing device is to detect that the guest operating system of the virtual machine has performed an I/O read of an I/O register of the plurality of I/O registers.

* * * * *